US008641083B2

(12) United States Patent
Nakamura et al.

(10) Patent No.: US 8,641,083 B2
(45) Date of Patent: Feb. 4, 2014

(54) ARRANGEMENT STRUCTURE FOR VEHICLE INTERIOR PARTS (75) Inventors: Mitsuyoshi Nakamura, Shioya-gun (JP); Kazunori Ito, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/809,023

(22) PCT Filed: Jun. 16, 2011

(86) PCT No.: PCT/JP2011/063825
§ 371 (c)(1),
(2), (4) Date: Jan. 8, 2013

(87) PCT Pub. No.: WO2012/011343
PCT Pub. Date: Jan. 26, 2012

(65) Prior Publication Data
US 2013/0119648 A1    May 16, 2013

(30) Foreign Application Priority Data
Jul. 23, 2010  (JP) ................................ 2010-166042

(51) Int. Cl.
*B60R 21/214* (2011.01)
(52) U.S. Cl.
USPC ...................... 280/728.2; 280/730.2; 296/1.02
(58) Field of Classification Search
USPC ............................ 280/728.2, 730.2; 296/1.02
See application file for complete search history.

(56) References Cited

U.S. PATENT DOCUMENTS

| 6,126,230 A * | 10/2000 | Ikeda et al. ............... 296/187.05 |
| 7,837,224 B2 * | 11/2010 | Benkler et al. ............. 280/730.2 |
| 7,850,197 B2 * | 12/2010 | Zucal et al. ................ 280/728.3 |
| 7,896,417 B2 * | 3/2011 | Gupta .......................... 296/1.02 |
| 2001/0000290 A1 | 4/2001 | Nakajima et al. |
| 2004/0140682 A1 * | 7/2004 | Ito et al. ....................... 296/1.02 |

(Continued)

FOREIGN PATENT DOCUMENTS

| EP | 1925503 A1 | 5/2008 |
| JP | 2002-510574 | 4/2002 |

(Continued)

OTHER PUBLICATIONS

Yasutsugu Kawatsu, Assist Grip Mounting Structure, Apr. 3, 2008, JPO, JP 2008-074307 A, Machine Translation of Description.*

(Continued)

*Primary Examiner* — James English
(74) *Attorney, Agent, or Firm* — Rankin, Hill & Clark LLP (57) ABSTRACT

A grab rail is attached via a bracket to an upper portion of a side panel inside a vehicle, and a curtain-shaped airbag is arranged in a folded state on a side portion of the side panel inside the vehicle. The bracket includes a vehicle body attachment seat section that is attached to an attachment surface formed on the side panel; an arm section that is bent from the vehicle body attachment seat section and extends downward and inward in the vehicle width direction; and a grab rail attachment seat section that is bent from a lower end of the arm section, extends upward and inward in the vehicle width direction, and has the grab rail attached thereto. A space section formed by the side panel and the arm section opens downwardly and serves as a storage portion for receipt of the folded curtain-shaped airbag.

6 Claims, 5 Drawing Sheets

(56) References Cited

U.S. PATENT DOCUMENTS

| | | | |
|---|---|---|---|
| 2005/0029780 A1 | 2/2005 | Tanase | |
| 2007/0080524 A1* | 4/2007 | Kim | 280/730.2 |
| 2007/0210561 A1* | 9/2007 | Yamagiwa et al. | 280/730.2 |
| 2008/0111389 A1* | 5/2008 | Benkler et al. | 296/1.02 |
| 2010/0049923 A1* | 2/2010 | Mathys et al. | 711/151 |

FOREIGN PATENT DOCUMENTS

| | | |
|---|---|---|
| JP | 2004-224065 | 8/2004 |
| JP | 2004-231147 | 8/2004 |
| JP | 2007-237865 | 9/2007 |
| JP | 2008-024283 | 2/2008 |
| JP | 2008-074307 | 4/2008 |
| JP | 2008-302889 | 12/2008 |
| JP | 2009-067221 | 4/2009 |

OTHER PUBLICATIONS

European Search Report, Application No. 11809517.3, dated Nov. 7, 2013, 3 pages.

* cited by examiner

ARRANGEMENT STRUCTURE FOR VEHICLE INTERIOR PARTS

TECHNICAL FIELD

The present invention relates to an arrangement structure for vehicle interior parts in which interior parts, such as curtain airbags and grab rails, are arranged.

Priority is claimed on Japanese Patent Application No. 2010-166042, filed Jul. 23, 2010, the content of which is incorporated herein by reference.

BACKGROUND ART

In recent years, a curtain airbag apparatus has been developed, which unfolds a curtain-shaped airbag (hereinafter referred to as curtain airbag) between a passenger and a vehicle body side portion to protect the passenger at the time of a side collision or the like of a vehicle.

This curtain airbag apparatus is attached such that the curtain airbag is folded in the front-rear direction of the vehicle body along a vehicle interior side portion of a side panel that constitutes a portion of a door opening of the vehicle body. In this curtain airbag apparatus, in a normal state (when the curtain airbag is not unfolded), the lower side of the curtain airbag is covered with a terminal portion of roof lining that is a skin material on a vehicle interior side. When an impact caused by collision or the like is input to the vehicle body, the curtain airbag is unfolded downward from the roof side portion by injecting high-pressure gas (inflating gas) using an inflator, to form a passenger protective wall between the passenger and the vehicle body side portion.

Incidentally, a grab rail gripped by a passenger is attached to the roof side portion within the vehicle interior. In a vehicle equipped with the aforementioned curtain airbag apparatus, the grab rail should be disposed so as to avoid interference with the curtain airbag.

In an attachment structure of the grab rail in the related art, a bracket is fixed to a perpendicular wall portion disposed to be flush with the opening surface of the door opening in the above side panel. The bracket is configured such that an arm section projects inward in the vehicle width direction from a vehicle body attachment seat section fixed to the above perpendicular wall portion, and a grab rail attachment seat section is provided at a front end portion of the arm section. The grab rail is attached to the grab rail attachment seat section of this bracket. The curtain airbag is disposed such that the airbag is folded below the arm section of the above bracket (for example, refer to Patent Documents 1 and 2).

PRIOR ART DOCUMENTS

Patent Documents

[Patent Document 1] Japanese Unexamined Patent Application, First Publication No. 2008-24283
[Patent Document 2] Japanese Unexamined Patent Application, First Publication No. 2008-302889

DISCLOSURE OF INVENTION

Problems to be Solved by the Invention

However, in the case of the above related art, the plate thickness direction of the arm section in the bracket is the front-rear direction of the vehicle body. For this reason, when the curtain airbag is inflated and unfolded, the curtain airbag comes into line contact with the arm section of the bracket, and local deformation is caused in the contact portion with the arm section. As a result, there is a concern that unfolding performance deteriorates. Therefore, in the related art, the upper side of the curtain airbag is covered with a protector below the bracket so as to keep the curtain airbag from coming into contact with the arm section of the bracket at the time of inflation and unfolding of the curtain airbag. However, if the protector is provided in this way, the number of parts and the weight will increase.

Additionally, the arm section of the bracket projects inward in the vehicle width direction from the perpendicular wall portion of the side panel. For this reason, when other interior parts (for example, harness, feeder wires, and the like) are disposed, these parts should be disposed while avoiding this arm section. That is, due to the presence of the arm section, this portion becomes a dead space, and the space within the vehicle interior cannot be effectively utilized.

Additionally, the arm section of the bracket becomes a vertical wall and has a shape that projects to the vehicle interior side. For this reason, in a case where an attempt is made to weld the bracket simultaneously with panel welding, the spot welding jig that moves in the front-rear direction of the vehicle in the panel joining portion, and the arm section of the bracket will interfere. Therefore, it is necessary to assemble the bracket to the vehicle body side with bolts or the like after the panel welding, which increases the number of assembly processes required.

Thus, an object of the invention is to provide an arrangement structure for vehicle interior parts that can improve the unfolding performance of a curtain-shaped airbag and can effectively utilize the surrounding space of a bracket for grab rail attachment.

Means for Solving the Problems

The arrangement structure for vehicle interior parts related to the invention adopts the following aspects in order to solve the above problems.

(1) In an arrangement structure for vehicle interior parts related to an aspect of the invention, a grab rail is attached via a bracket to an upper portion of a side panel inside a vehicle, the side panel forming a portion of an opening of a vehicle body; and a curtain-shaped airbag is arranged in a folded state on a side portion of the side panel inside the vehicle, the curtain-shaped airbag extending in a front-rear direction of the vehicle body. The bracket is plate-shaped and is disposed such that a thickness direction thereof intersects the front-rear direction of the vehicle body. The bracket includes a vehicle body attachment seat section that is attached to an attachment surface formed on the side panel; an arm section that is bent from the vehicle body attachment seat section and extends downward and inward in a vehicle width direction; and a grab rail attachment seat section that is bent from a lower end of the arm section, extends upward and inward in the vehicle width direction, and has the grab rail attached thereto. A space section that opens downward and that is formed by the side panel and the arm section of the bracket serves as a storage portion in which the folded curtain-shaped airbag is stored.

(2) In the aspect described in the above (1), a configuration may be adopted in which an inflator that supplies high pressure gas to the curtain-shaped airbag is disposed in parallel with the curtain-shaped airbag between the vehicle body attachment seat section of the bracket and the curtain-shaped airbag stored in the storage portion.

(3) In the aspect described in the above (1) or (2), a configuration may be adopted in which the attachment surface of the side panel serves as a welded portion that extends along the front-rear direction of the vehicle body and is welded to a roof panel, and the vehicle body attachment seat portion of the bracket is welded together with the side panel and the roof panel.

(4) In the aspect described in the above (1) or (2), a configuration may be adopted in which the grab rail is supported by a plurality of the brackets, and all the plurality of brackets have the same shape and the same dimensions.

Effects of Invention

According to the aspect described in the above (1), the plate thickness direction of the bracket is directed to the direction orthogonal to the front-rear direction of the vehicle body. For this reason, when the curtain airbag is inflated and unfolded, the curtain airbag comes into surface contact with the bracket even in a case where the airbag comes into contact with the bracket. Accordingly, the bracket does not exert a deleterious influence on the unfolding performance of the curtain airbag, and the unfolding performance of the curtain airbag is improved. Additionally, the protector, which covers the upper side of the curtain airbag and that is required in the related art in order to prevent the curtain airbag from coming into line contact with the bracket, becomes unnecessary. For this reason, the number of parts can be reduced and cost reduction can be achieved.

Additionally, the plate thickness direction of the bracket is directed to the direction orthogonal to the front-rear direction of the vehicle body. For this reason, the space below the bracket can be widened, and parts can be disposed along the front-rear direction of the vehicle body in this space. As a result, the vehicle interior side space of the side panel below the bracket can be effectively utilized, and the interior space can be widely secured correspondingly.

Moreover, in a case where a passenger's head comes into contact with the grab rail 20 due to input of an impact at the time of collision or the like, the grab rail attachment seat section is bent and deformed to the vehicle outside, with a connecting portion with the arm section as a center. For this reason, the impact can be absorbed.

In the case of the above (2), the vehicle interior side space of the side panel below the bracket can be effectively utilized.

In the case of the above (3), the number of assembly processes can be reduced and cost reduction can be achieved.

In the case of the above (4), sharing of parts is possible, and cost reduction can be achieved. Additionally, the invention is also advantageous in terms of management of parts.

DESCRIPTION OF EMBODIMENTS

An embodiment of an arrangement structure for vehicle interior parts related to the invention will be described below with reference to FIGS. 1 to 4. In addition, an arrow F in the drawings indicates a vehicle body front, and an arrow I indicates the inside in the vehicle width direction.

Figure 1:
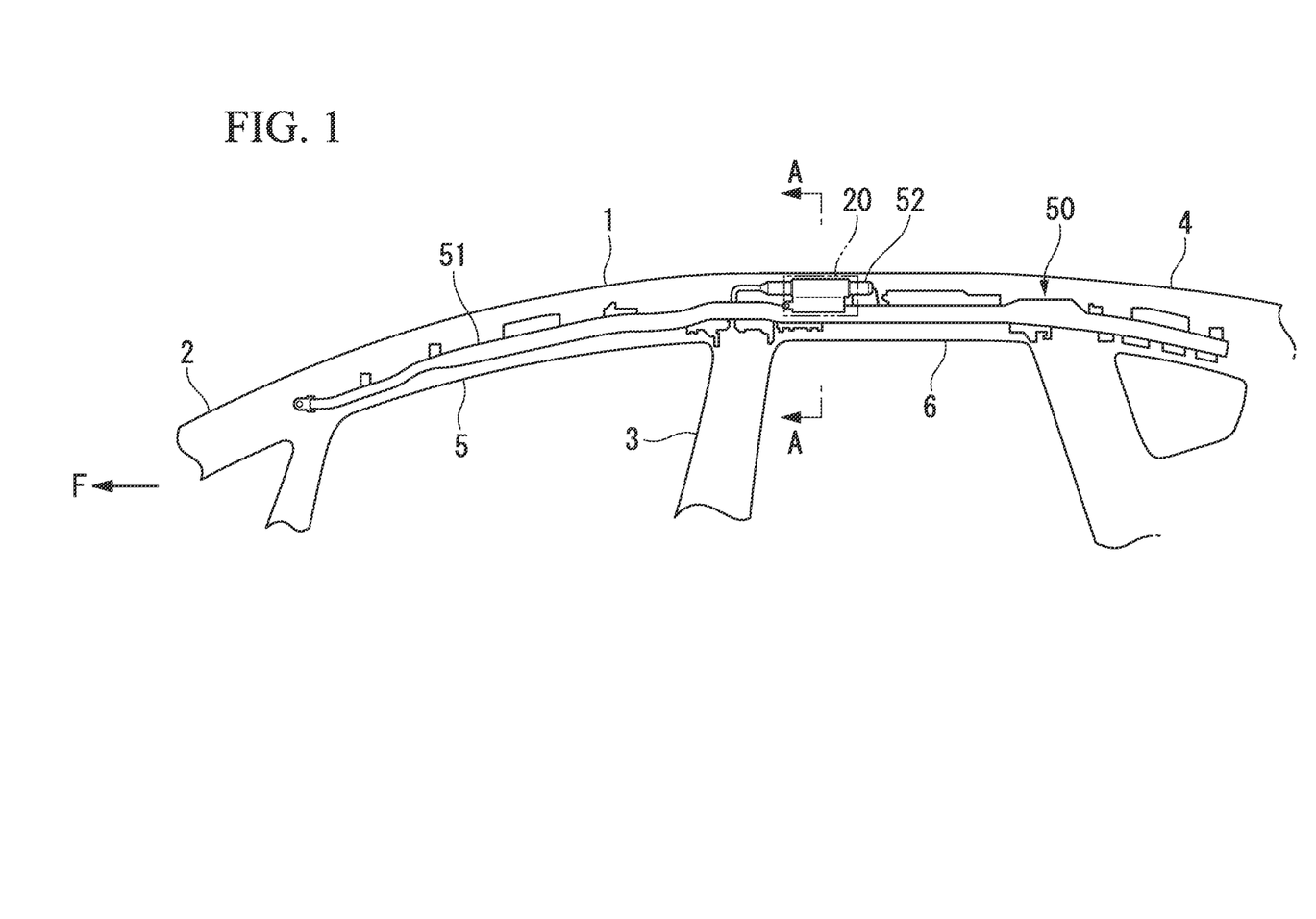
FIG. 1 is a view showing an embodiment of an arrangement structure for vehicle interior parts related to the invention, and is a front view when the attachment state of a curtain airbag and an inflator is viewed from the vehicle interior side.

FIG. 1 is a front view when a portion of a roof side rail on the right side of a vehicle is viewed from the vehicle interior side. Reference numeral 1 in FIG. 1 designates a roof side rail, reference numeral 2 designates a front pillar, reference numeral 3 designates a center pillar, reference numeral 4 designates a rear side panel, reference numeral 5 designates a front door opening, and reference numeral 6 designates a rear door opening. In this embodiment, the roof side rail 1 constitutes a side panel that constitutes a portion of the front door opening 5 and the rear door opening 6.

A curtain-shaped airbag (hereinafter referred to as a curtain airbag) 51 of a curtain airbag apparatus 50 is attached to a side portion of the roof side rail 1 inside the vehicle in a folded state. The curtain airbag 51 extends in the front-rear direction of the vehicle body, and is disposed along the vehicle interior side portion of the roof side rail 1 from a rear end of the front pillar 2 to the rear side panel 4.

Additionally, an inflator 52 of the curtain airbag apparatus 50, and a grab rail 20 are disposed slightly behind the center pillar 3 in the roof side rail 1 inside the vehicle so as to overlap each other in front view. In FIG. 1, for convenience of illustration, the grab rail 20 is simplified into a rectangular shape, and is shown by two-dot chain lines. The inflator 52 is a gas generator that generates high-pressure gas when an impact is input due to a collision or the like to supply the gas into the curtain airbag 51. The inflator 52 is connected at nearly the intermediate position of the curtain airbag 51 in the longitudinal direction. The curtain airbag 51 is inflated and unfolded by the inflow of this high-pressure gas.

Figure 2:
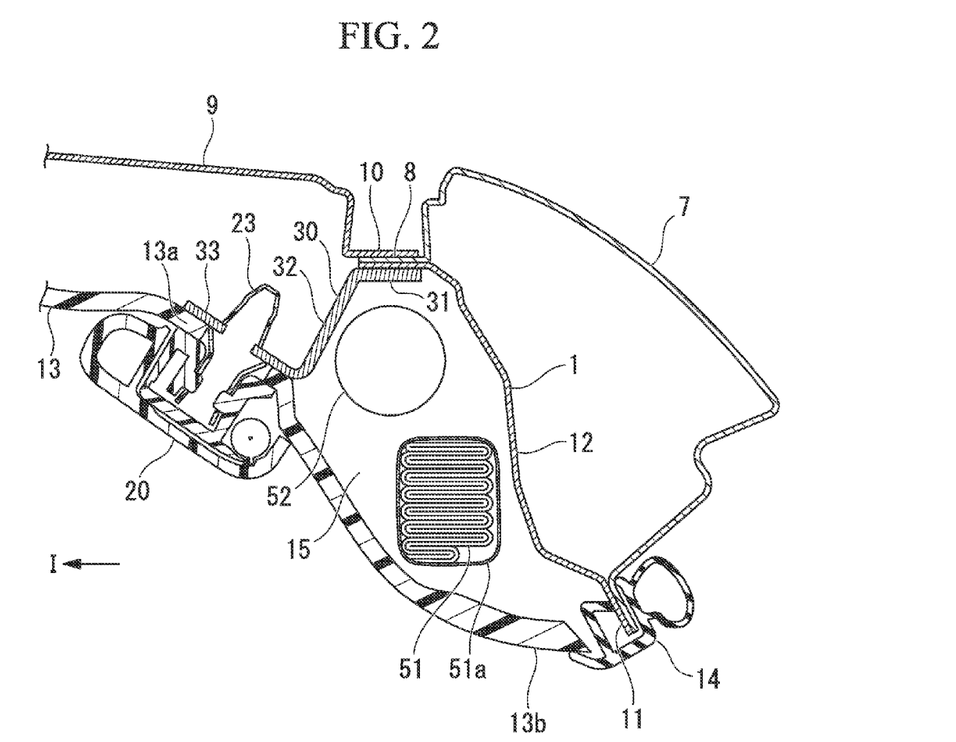
FIG. 2 is a view showing an A-A cross-section of FIG. 1.

FIG. 2 is a view showing an A-A cross-section of FIG. 1. An outside panel 7 is disposed on the vehicle outside of the roof side rail 1. The roof side rail 1 and the outside panel 7 are jointed to each other at both ends thereof in the vehicle width direction, and form a closed cross-section structure. A joining flange (attachment surface) 8 at the upper end is joined to an end portion of the roof panel 9 in the vehicle width direction, and constitutes a panel-joining portion 10. The panel-joining portion 10 forms a substantially horizontal surface, and extends in the front-rear direction of the vehicle body. The roof side rail 1, the outside panel 7, and the roof panel 9 are all made of metal. Joining in the panel-joining portion 10 is performed by welding. The joining flange 8 at the upper end and the joining flange 11 at the lower end in the roof side rail 1 are coupled by a vertical wall portion 12 that extends below while swelling outward in the vehicle width direction from the joining flange 8 at the upper end.

A roof lining 13 that is a skin material is attached to the roof side rail 1 and a roof panel 9 inside the vehicle. The edge of the roof lining 13 in the vehicle width direction extends to the vicinity of the joining flange 11 at the lower end of the roof side rail 1 and the outside panel 7, and is disposed so as to come into close contact with the seal member 14 mounted on the joining flange 11.

Figure 3:
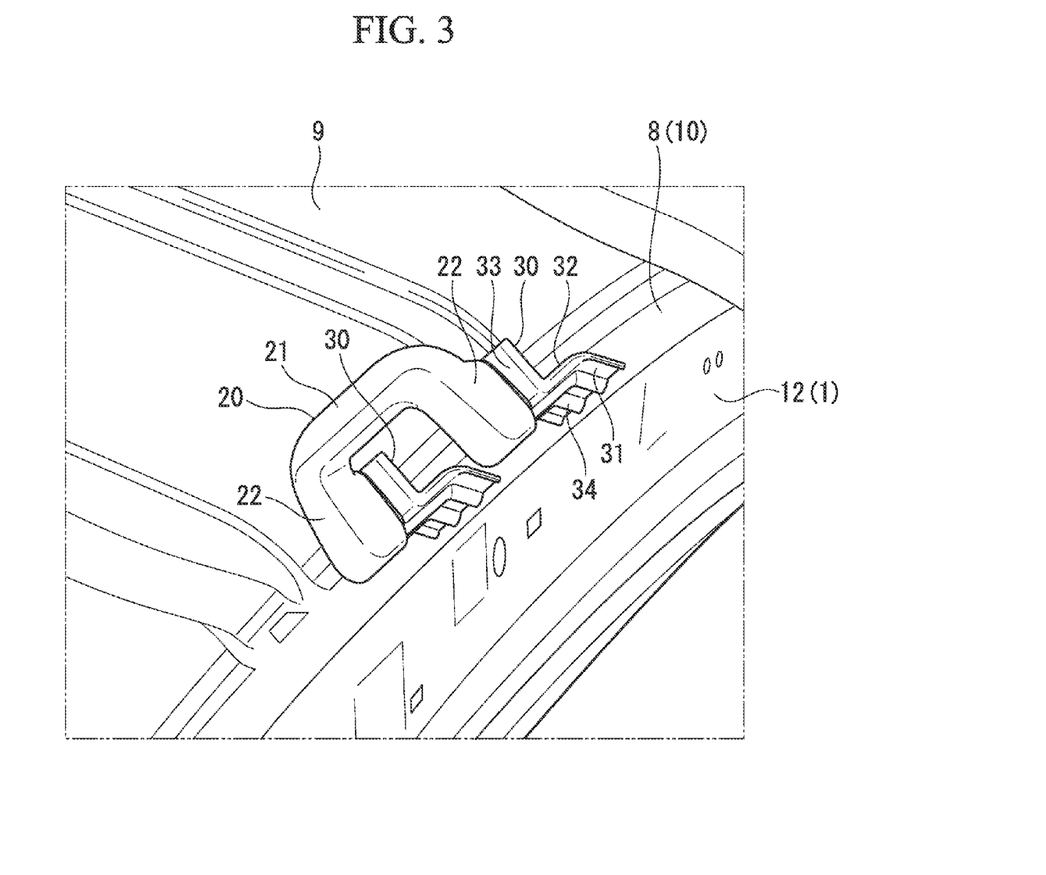
FIG. 3 is a perspective view when the attachment state of a grab rail is viewed from the vehicle interior side.

A grab rail 20 is attached to a side position of a seat within the vehicle interior (not shown) via one pair of metallic brackets 30, as shown in FIG. 3, in the vertical wall portion 12 of the roof side rail 1 inside the vehicle. In addition, in FIG. 3, the curtain airbag 51, the inflator 52, and the roof lining 13 are omitted for convenience of illustration. The grab rail 20 is a part that is gripped by a passenger who sits on the seat for maintaining posture or ensuring security. The grab rail 20 is fixed to the brackets 30 by both ends 22 of a grip portion 21, which the passenger grips, being screwed to a clip 23 (refer to FIG. 2).

Figure 4:
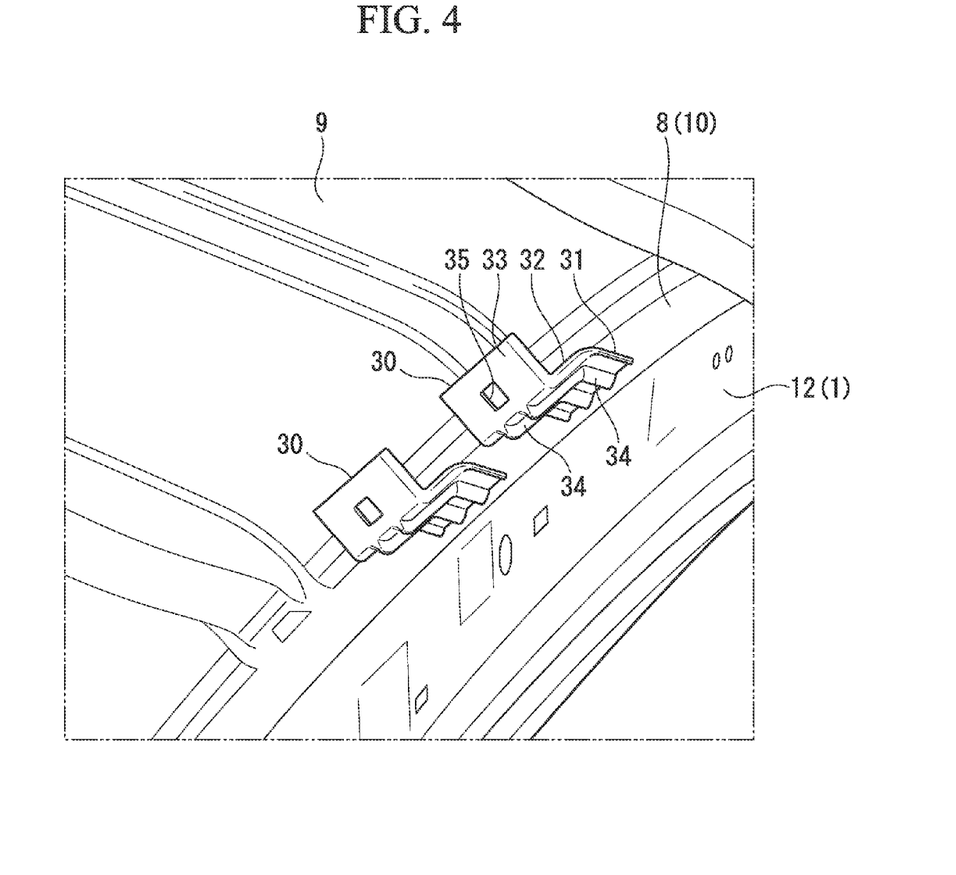
FIG. 4 is a perspective view when the attachment state of brackets is viewed from the vehicle interior side.

FIG. 4 is a drawing showing the attachment state of the brackets 30 before the grab rail 20 is mounted.

Both of the brackets 30 are formed in the same shape with the same dimensions. The brackets 30 are disposed so as to be spaced apart from each other by a predetermined dimension along the front-rear direction of the vehicle body. Each bracket 30 is formed by press-forming a metal plate, has a bent plate shape, and is disposed such that the plate thickness direction thereof intersects the front-rear direction of the vehicle body (orthogonal to the direction in the present embodiment). Each bracket 30 includes a vehicle body attachment seat section 31, an arm section 32, and a grab rail attachment seat section 33. The vehicle body attachment seat section 31 is fixed to the joining flange 8 at the upper end of the roof side rail 1. The arm section 32 is bent from an inside end portion of the vehicle body attachment seat section 31 in the vehicle width direction, and extends obliquely downward and inward in the vehicle width direction. The grab rail attachment seat section 33 is bent from the lower end of the arm section 32, and extends obliquely upward and inward in the vehicle width direction. Two ridges 34 serving as reinforcing ribs that have a circular-arc and convex cross-sectional shape and extend along the vehicle width direction are provided in parallel on the lower sides of the vehicle body attachment seat section 31 and the arm section 32. The grab rail attachment seat section 33 is formed in a plate shape, and has a hole 35 for a grab rail attachment provided at the center thereof. The grab rail attachment seat section 33 is not provided with the ridges 34.

The vehicle body attachment seat sections 31 of the brackets 30 are welded together and fixed to the joining flange 8, when the roof side rail 1, the outside panel 7, and the roof panel 9 are welded in the panel-joining portion 10. Here, the plate thickness direction of the brackets 30 is directed to a direction orthogonal to the front-rear direction of the vehicle body, and the arm sections 32 of the brackets 30 are not present below the panel-joining portion 10. For this reason, even if a spot welding jig is moved along the longitudinal direction (that is, the front-rear direction of the vehicle) of the panel-joining portion 10 during the welding, the spot welding jig and the arm section 32 do not interfere.

The end portions 22 of the grip portion 21 of the grab rail 20 are respectively fixed to the grab rail attachment seat sections 33 of both the brackets 30 by the clips 23 and screws (not shown). The size and weight of the brackets 30 can be reduced by using the two brackets 30 with respect to one grab rail 20 in this way.

The brackets 30 are fixed to the panel-joining portion 10 in this way. Additionally, as shown in FIG. 2, a downward space section is formed by being surrounded by the roof side rail 1 and the arm sections 32 of the brackets 30. The space section serves as the storage portion 15 where the curtain airbag 51 and the inflator 52 of the curtain airbag apparatus 50 are stored.

The inflator 52 is disposed almost directly below the vehicle body attachment seat sections 31 of the brackets 30 within the storage portion 15. The curtain airbag 51 in a folded state is disposed closer to the vehicle outside in the vehicle width direction and obliquely lower than the inflator 52 within the storage portion 15. That is, the inflator 52 is disposed between the vehicle body attachment seat sections 31 of the brackets 30 and the curtain airbag 51. Both the folded curtain airbag 51 and the inflator 52 are disposed such that the longitudinal direction thereof runs along the front-rear direction of the vehicle body. That is, the curtain airbag 51 and the inflator 52 are disposed in parallel within the storage portion 15.

In addition, the curtain airbag 51 and the inflator 52 are attached to the vertical wall portion 12 of the roof side rail 1 via the brackets which are not shown. In FIG. 2, reference numeral 51a designates a thin film cover that surrounds the folded curtain airbag 51. The thin film cover 51a is configured so as to be able to be easily ruptured when the curtain airbag 51 is inflated and unfolded.

As shown in FIG. 2, a side edge 13a of the roof lining 13 in the vehicle width direction overlaps the surface of the grab rail attachment seat section 33 of the bracket 30 inside the vehicle. The side edge 13a is fixed to the grab rail attachment seat section 33 along with the grab rail 20 in a state where the side edge 13a is sandwiched between the end portions 22 of the grip portion 21 of the grab rail 20. An edge 13b outside the side edge 13a in the roof lining 13 is pushed open downward when the curtain airbag 51 is unfolded. This allows unfolding of the curtain airbag 51.

In such a configuration, if an impact is input to the vehicle due to a side collision or the like, the inflator 52 generates high-pressure gas. If this high-pressure gas is supplied to the curtain airbag 51, the curtain airbag 51 is inflated, the thin film cover 51a is ruptured, the edge 13b of the roof lining 13 is pushed open, and the curtain airbag 51 is unfolded downward.

When the curtain airbag 51 is unfolded, the curtain airbag 51 also spreads partially upward, and tends to approach the brackets 30. However, since the inflator 52 is present below the brackets 30, the way is obstructed by the inflator 52. This prevents the curtain airbag 51 in the inflation process from coming into contact with the brackets 30.

Additionally, even if the curtain airbag 51 in the inflation process turns from the periphery of the inflator 52 and comes into contact with the brackets 30, since the plate thickness direction of the brackets 30 is directed to the direction orthogonal to the front-rear direction of the vehicle body, the curtain airbag 51 comes into surface contact with the brackets 30. For this reason, the brackets 30 do not exert a negative influence on the unfolding performance of the curtain airbag 51. Accordingly, the unfolding performance of the curtain airbag 51 is improved. Additionally, the protector installed so as to cover the upper side of the curtain airbag 51 in order to prevent the curtain airbag 51 from coming into line contact with the bracket in the related art becomes unnecessary. For this reason, the number of parts can be reduced and cost reduction can be achieved.

Additionally, the inflator 52 is connected almost at the center of the curtain airbag 51 in the longitudinal direction. For this reason, the channel length of gas that flows into the front side of the vehicle body in the curtain airbag 51 from this connection is almost equal to the channel length of gas that flows into the rear side of the vehicle body in the curtain airbag 51. Therefore, the high-pressure gas generated by the inflator 52 can be quickly and almost uniformly made to flow in the front-rear direction of the vehicle body. As a result, the unfolding performance of the curtain airbag 51 is improved.

Figure 5:
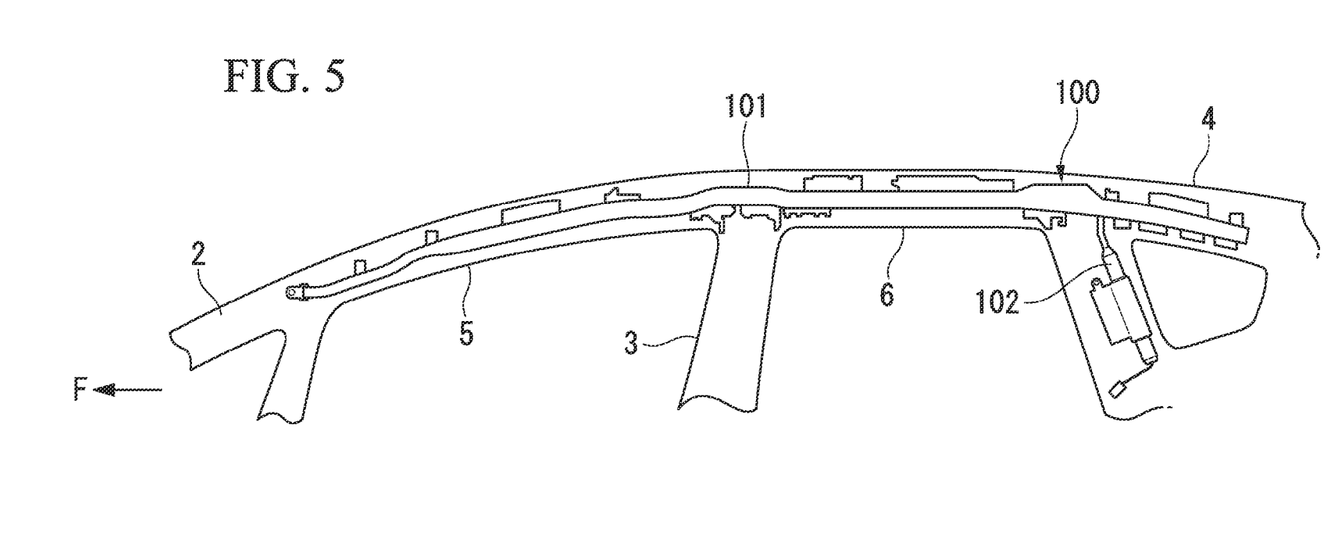
FIG. 5 is a front view when the attachment state of a general curtain airbag and inflator in the related art is viewed from the vehicle interior side.

In addition, FIG. 5 is a view equivalent to FIG. 1, showing the arrangement and connection relationship of a curtain airbag 101 and an inflator 102 in a curtain airbag apparatus 100 of the related art. In FIG. 5, the same reference numerals are given to the same aspect portions as the aforementioned embodiment. As shown in this drawing, in the related art, the inflator 102 is vertically installed in the rear side panel 4, and the inflator 102 is connected to a rear end portion of the curtain airbag 101. Therefore, the high-pressure gas generated by the inflator 102 is supplied from the rear end side of the curtain airbag 101, and flows to the front end side of the curtain airbag 101. For this reason, the gas channel length becomes long, and gas pressure does not reach the front end side of the curtain airbag 101 easily. On the other hand, occurrence of such a problem can be prevented in the curtain airbag apparatus 50 of the above embodiment.

Additionally, the plate thickness direction of the brackets 30 is directed to the direction orthogonal to the front-rear direction of the vehicle body. Hence, when parts are disposed along the front-rear direction of the vehicle body in the space section below the brackets 30, there is nothing that becomes obstructive. For this reason, in the present embodiment, the inflator 52 can be disposed below the brackets 30. Additionally, harness, feeder wires, and the like that are not shown can be disposed in parallel with the curtain airbag 51 directly below on the brackets 30. Thereby, the vehicle interior side space of the roof side rail 1 below the brackets 30 can be effectively utilized, and the interior space can be widely secured.

Incidentally, a case where a passenger's head comes into contact with the grab rail 20 due to input of an impact at the time of a collision or the like can be considered. In contrast, in the present embodiment, the grab rail attachment seat section 33 of the bracket 30 is plate-shaped, and the ridges 34 are not provided. For this reason, when a passenger's head comes into contact with the grab rail 20, the grab rail attachment seat section 33 is bent and deformed to the vehicle outside, with a connecting portion with the arm section 32 as a center. Hence, the impact can be absorbed.

Additionally, the ridges 34 are provided along the vehicle width direction on the vehicle body attachment seat section 31 and the arm section 32 of the bracket 30. For this reason, in a case where a passenger grips and pulls downward the grip portion 21 of the grab rail 20 for maintenance of posture in ordinary usage, the rigidity in the pulling direction can be secured.

As additionally mentioned above, the vehicle body attachment seat section 31 of the bracket 30 is welded together with the roof side rail 1, the outside panel 7, and the roof panel 9 in the panel-joining portion 10. For this reason, the number of assembly processes can be reduced and cost reduction can be achieved.

Additionally, in the above-mentioned description, the attachment of the grab rail 20 is on the right side within the vehicle interior of the vehicle. On the other hand, the same configuration can also be adopted regarding the grab rail 20 on the left side within the vehicle interior. In that case, the brackets 30 for attachment of the grab rail 20 on the right side within the vehicle interior, and the brackets 30 for attachment of the grab rail 20 on the left side within the vehicle interior have the same shape and the same dimensions. As a result, sharing of parts is possible, and cost reduction can be achieved. Additionally, the invention is also advantageous in terms of management of parts.

Other Embodiments

In addition, the invention is not limited to the aforementioned embodiment only.

For example, in the aforementioned embodiment, the inflator 52 is disposed below the brackets 30 for attachment of the grab rail 20 between the brackets 30 and the curtain airbag 51. However, the inflator 52 may be installed at a different location. Even in this way, when the curtain airbag 51 is inflated and unfolded, the curtain airbag 51 comes into surface contact with the brackets 30. Therefore, the brackets 30 do not exert a negative influence on the unfolding performance of the curtain airbag 51, and the unfolding performance of the curtain airbag 51 is improved.

BRIEF DESCRIPTION OF THE REFERENCE SYMBOLS

1: ROOF SIDE RAIL (SIDE PANEL)
5: FRONT DOOR OPENING (SIDE PANEL)
6: REAR DOOR OPENING (OPENING)
7: OUTSIDE PANEL
8: JOINING FLANGE (ATTACHMENT SURFACE)
9: ROOF PANEL
10: PANEL-JOINING PORTION
15: STORAGE SECTION
20: GRAB RAIL
30: BRACKET
31: VEHICLE BODY ATTACHMENT SEAT SECTION
32: ARM SECTION
33: GRAB RAIL ATTACHMENT SEAT SECTION
51: CURTAIN AIRBAG (CURTAIN-SHAPED AIRBAG)
52: INFLATOR

The invention claimed is:

1. An arrangement structure for vehicle interior parts, comprising:
  a bracket that is plate-shaped and is disposed such that a thickness direction thereof intersects a front-rear direction of a vehicle body, wherein the bracket includes
    a vehicle body attachment seat section that is attached to an attachment surface formed on a side panel,
    an arm section that is bent from the vehicle body attachment seat section and extends downwardly and inwardly from the vehicle body attachment seat section in a vehicle width direction, and
    a grab rail attachment seat section that is bent from a lower end of the arm section and extends upwardly and inwardly from the arm section in the vehicle width direction,
  a grab rail that is attached via the grab rail attachment seat section of the bracket to an upper portion of the side panel inside a vehicle, wherein the side panel forms a portion of an opening of the vehicle body,
  a curtain-shaped airbag that is arranged in a folded state on a side portion of the side panel inside the vehicle, the curtain-shaped airbag extending in the front-rear direction of the vehicle body, and
  an inflator that supplies high-pressure gas to the curtain-shaped airbag,
  wherein the side panel and the arm section of the bracket cooperate to define a space section that opens downward to receive the folded curtain-shaped airbag, and wherein the inflator is disposed between the side panel and the bracket such that an imaginary vertical line orthogonally extending downward from the vehicle body attachment seat section of the bracket extends through the inflator and the curtain-shaped airbag.

2. The arrangement structure for vehicle interior parts according to claim 1,
  wherein the inflator is disposed in parallel with the curtain-shaped airbag.

3. The arrangement structure for vehicle interior parts according to claim 1,
  wherein the attachment surface of the side panel serves as a welded portion that extends along the front-rear direction of the vehicle body and is welded to a roof panel, and
  wherein the vehicle body attachment seat section of the bracket is welded together with the side panel and the roof panel.

4. The arrangement structure for vehicle interior parts according to claim 1,
   wherein the grab rail is supported by a plurality of the brackets, and
   wherein all the plurality of brackets have the same shape and the same dimensions.

5. The arrangement structure for vehicle interior parts according to claim 2,
   wherein the attachment surface of the side panel serves as a welded portion that extends along the front-rear direction of the vehicle body and is welded to a roof panel, and
   wherein the vehicle body attachment seat section of the bracket is welded together with the side panel and the roof panel.

6. The arrangement structure for vehicle interior parts according to claim 2,
   wherein the grab rail is supported by a plurality of the brackets, and
   wherein all the plurality of brackets have the same shape and the same dimensions.

\* \* \* \* \*